United States Patent
Ang

[11] Patent Number: 5,126,873
[45] Date of Patent: Jun. 30, 1992

[54] REFLECTIVE SURFACE COATING FOR A UNIFORM INTENSITY OF A POLARIZED BEAM OF A ROTATING POLYGON MIRROR OPTICAL SCANNING SYSTEM

[75] Inventor: Anthony Ang, El Segundo, Calif.

[73] Assignee: Xerox Corporation, Stamford, Conn.

[21] Appl. No.: 716,887

[22] Filed: Jun. 18, 1991

[51] Int. Cl.$^5$ .......................... G02B 26/08; G02B 5/22
[52] U.S. Cl. ...................... 359/217; 359/212; 359/359
[58] Field of Search .................. 359/196–197, 359/212, 216–217, 223, 359, 360, 245, 246, 298, 301, 304

[56] References Cited
U.S. PATENT DOCUMENTS

| | | | |
|---|---|---|---|
| 4,318,582 | 3/1982 | Minoura et al. | 359/202 |
| 4,504,109 | 3/1985 | Taga et al. | 359/359 |
| 4,643,518 | 2/1987 | Taniguchi | 359/218 |
| 4,753,504 | 6/1988 | Kyogoku | 359/217 |
| 5,007,692 | 4/1991 | Matsuura | 359/217 |

OTHER PUBLICATIONS

K. C. Park "The Extreme Values of Reflectivity and the Conditions for Zero Reflection from Thin Dielectric Films on Metal"; Applied Optics; Jul. 1964, vol. 3, No 7, pp. 877–881.

Primary Examiner—Bruce Y. Arnold
Assistant Examiner—James Phan
Attorney, Agent, or Firm—William Propp

[57] ABSTRACT

A reflective surface coating of dielectric material, such as silicon dioxide, with an optical thickness of 0.05 of the wavelengths of the incident linearly polarized coherent beam having an equal intensity in the S and P polarization will yield a uniform intensity across a range of angles of incidence. A reflective surface coating with an optical thickness of 0.40 of the wavelengths of the incident linearly polarized coherent beam in the S polarization will yield a uniform intensity across a range of angles of incidence.

4 Claims, 6 Drawing Sheets

| Angle of Incidence | Perpendicular S Polarization | Parallel P Polarization | Angle of Incidence | Average Polarization | Uniformity |
|---|---|---|---|---|---|
| 0 | 90.38 | 90.38 | 0 | 90.38 | 99.96 |
| 5 | 90.41 | 90.35 | 5 | 90.38 | 99.96 |
| 10 | 90.52 | 90.26 | 10 | 90.39 | 99.97 |
| 15 | 90.69 | 90.10 | 15 | 90.40 | 99.98 |
| 20 | 90.93 | 89.88 | 20 | 90.41 | 99.99 |
| 25 | 91.24 | 89.59 | 25 | 90.42 | 100.00 |
| 30 | 91.62 | 89.21 | 30 | 90.41 | 99.99 |
| 35 | 92.05 | 88.74 | 35 | 90.39 | 99.97 |
| 40 | 92.55 | 88.15 | 40 | 90.35 | 99.92 |
| 45 | 93.11 | 87.44 | 45 | 90.27 | 99.83 |
| 50 | 93.71 | 86.59 | 50 | 90.15 | 99.70 |
| 55 | 94.37 | 85.56 | 55 | 89.97 | 99.50 |
| 60 | 95.08 | 84.37 | 60 | 89.72 | 99.23 |
| 65 | 95.82 | 83.04 | 65 | 89.43 | 98.91 |
| 70 | 96.61 | 81.76 | 70 | 89.18 | 98.63 |
| 75 | 97.42 | 81.03 | 75 | 89.23 | 98.68 |
| 80 | 98.26 | 82.21 | 80 | 90.23 | 99.79 |
| 85 | 99.12 | 87.90 | 85 | 93.51 | 103.42 |
| 90 | 100.00 | 100.00 | 90 | 100.00 | 110.60 |

*Fig. 2*

| Angle of Incidence | Reflection S Polarization | Uniformity |
|---|---|---|
| 0 | 90.61 | 99.66 |
| 5 | 90.62 | 99.67 |
| 10 | 90.65 | 99.70 |
| 15 | 90.70 | 99.76 |
| 20 | 90.76 | 99.82 |
| 25 | 90.82 | 99.89 |
| 30 | 90.88 | 99.96 |
| 35 | 90.91 | 99.99 |
| 40 | 90.92 | 100.00 |
| 45 | 90.88 | 99.96 |
| 50 | 90.79 | 99.86 |
| 55 | 90.64 | 99.69 |
| 60 | 90.46 | 99.49 |
| 65 | 90.29 | 99.31 |
| 70 | 90.26 | 99.27 |
| 75 | 90.67 | 99.73 |
| 80 | 90.08 | 101.28 |
| 85 | 95.17 | 104.67 |
| 90 | 100.00 | 109.99 |

*Fig. 5*

REFLECTIVE SURFACE COATING FOR A UNIFORM INTENSITY OF A POLARIZED BEAM OF A ROTATING POLYGON MIRROR OPTICAL SCANNING SYSTEM

BACKGROUND OF THE INVENTION

This invention relates to a coating for a reflective surface, and, more particularly, to a coating which provides a uniform intensity in a polarized beam reflected from the reflective surface of a rotating polygon mirror over a wide range of incident angles.

Many conventional raster optical scanners utilize a multi-faceted rotating polygon mirror as the scanning element. A collimated beam of light, as for example from a laser, strikes the surface of the facets of the rotating polygon which causes the reflected light to revolve about an axis near the center of rotation of the rotating polygon and scan a straight line. This reflected light can be utilized as a scanning beam to scan a document at the input end of an imaging system or can be used as an imaging beam to impinge upon a photosensitive medium in the output mode.

In raster optical scanners, it is essential that the intensity of the scanning beam be accurately controlled at the scan line for scanning or the imaging beam be accurately controlled at the recording member which typically comprises the photoreceptor in a xerographic system. Control over the beam's intensity is critical if the proper exposure level for the particular recording member is to be assured, and if variations in intensity across the scan line and from scan line to scan line, in the laser output power, and in transmittance, reflectance and throughput efficiency of the various optical components are to be compensated for. Some control techniques commonly used for this purpose are the addition of neutral density filters to the optical scanning system, making the entire laser tube assembly rotatable to permit the laser to be adjusted for polarization sensitive modulators, adjusting the rf drive power to the modulator for a recording member at the scan line by either varying the supply voltage or the amplitude of the image signals being input to the modulator, and adjusting the laser power supply.

However, the addition of neutral density filters and adjustment of the laser tube assembly are only capable of being implemented manually which limits their desirability. On the other hand, adjustments to the modulator drive power and to the laser power supply can be implemented in either manual or automatic fashion, the latter typically being in response to laser beam intensity, which renders these control techniques somewhat more desirable.

Notwithstanding, there are certain disadvantages with each of these control techniques. In particular, the addition of neutral density filters may induce flare light and beam aberrations. Permitting adjustment of the laser tube assembly can result in pointing errors in the laser beam and require subsequent realignment of the other optical components in the optical scanning system following each adjustment of the laser. And although adjustment of either modulator or laser power may be carried out automatically, adjusting the laser power supply is known to be impractical for gas type laser, which compromise the bulk of present day optical scanners, while adjusting the modulator drive power requires complex and expensive electronic circuits.

One proposed solution has been to use a twisted nematic liquid crystal or a magneto-optic cell to rotate the plane of a linearly polarized scanning beam transmitted through the crystal or cell to maximize beam intensity.

However, certain raster optical scanner applications require a uniform intensity, preferably at a maximum level, rather than just the maximum beam intensity. This uniform intensity is important for gray scale printing, for example. The more uniform the intensity of the output power of the imaging beam, the more uniform the print pattern across the printed page will be. This uniform intensity is also important for precise scanning of an input document.

Moreover, as the polygon mirror of the raster optical scanner rotates, the angle of the incident beam striking the reflective surface of a mirror facet will vary, as will, of course, the angle of reflection of the reflected beam from the mirror facet. Therefore, the intensity of the incident beam must be uniform over a wide range of angles as the beam strikes the rotating polygon mirror facet and is reflected across the scan line.

It is an object of this invention to provide a uniform intensity of a incident beam over a wide range of angles as the beam strikes the rotating polygon mirror facet and is reflected across the scan line.

It is another object of this invention to provide a simple means using just an incident beam and the rotating polygon mirror of an optical scanning system to provide a uniform maximum intensity for a reflected beam to be used in scanning or imaging.

SUMMARY OF THE INVENTION

In accordance with the present invention, a dielectric material coating, such as silicon dioxide, is deposited on the reflective surface of a facet of a rotating polygon mirror with a scanner imaging beam striking the reflective surface. The coating with an optical thickness of 0.05 of the wavelength of the incident linearly polarized coherent beam having an equal intensity in the S and P polarization will yield a uniform intensity across a range of angles of incidence. A reflective surface coating of a dielectric material, such as silicon dioxide, with an optical thickness of 0.40 of the wavelength of the incident linearly polarized coherent beam in the S polarization will also yield a uniform intensity across a range of angles of incidence.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is a chart illustrating the reflectivity of the S polarization and the P polarization, the reflectivity of the average polarization and the uniformity of intensity for an incident coherent beam at varying angles of incidence to an embodiment of the coated reflective surface of a rotating polygon mirror formed according to the present invention.

FIG. 5 is a chart illustrating the reflectivity of the S polarization and the uniformity of intensity for an incident coherent beam at varying angles of incidence to another embodiment of the coated reflective surface of a rotating polygon mirror formed according to the present invention.

DESCRIPTION OF THE PREFERRED EMBODIMENT

Figure 1:
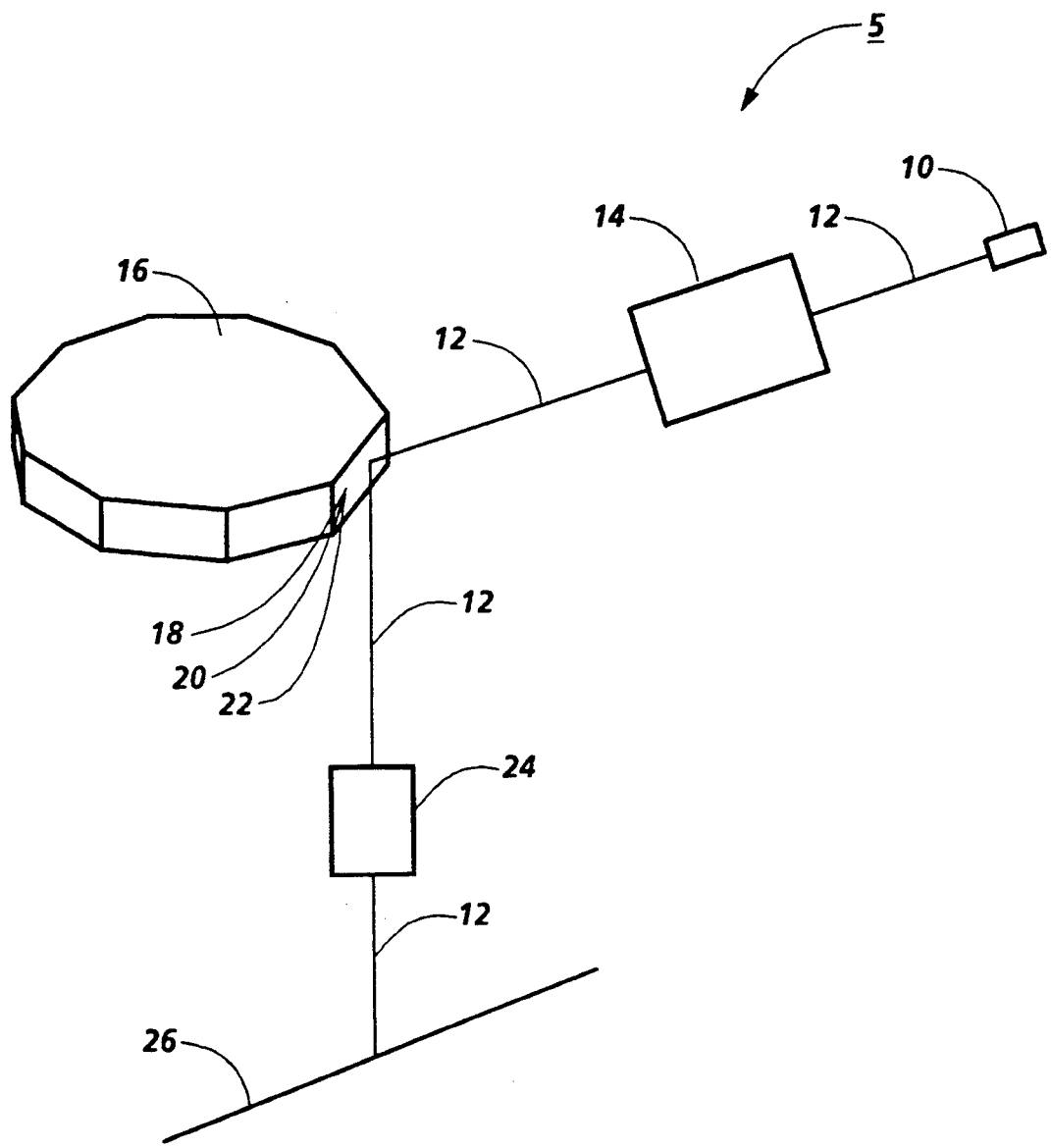
FIG. 1 is a schematic illustration of a perspective elevation of the rotating polygon mirror optical scanning system with a reflective surface coating formed according to the present invention.

Reference is now made to FIG. 1 wherein there is disclosed a rotating polygon mirror optical scanning system 5. A coherent light source 10 generates a light beam 12 of a single optical wavelength which passes through the pre-polygon mirror optics 14. The pre-polygon mirror optics 14 can include lenses, mirrors and other optical components to collimate, converge, diverge or otherwise modify the beam 12 prior to the beam striking the rotating polygon mirror 16. The pre-polygon mirror optics 14 may include means to modulate the beam is the optical scanning system is to be used to record on a scan line on a recording medium.

After the pre-polygon mirror optics 14, the beam is incident upon a facet 18 of the rotating polygon mirror 16 striking the reflective surface 20 of the fact. A coating 22 of dielectric material has been deposited on the reflective surface and the beam will pass through the coating before and after being reflected from the surface 20. After reflection from the facet 18 of the rotating polygon mirror 16, the beam 12 then passes through the post-polygon mirror optics 24 which can include lenses, mirrors and other components to collimate, converge, diverge or otherwise modify the beam 12 to focus the beam on the scan line 26 to either scan or record along that line.

Except for the coating 22 and the nature of the beam 12 which are the subject of the present invention, the rotating polygon mirror optical scanning system 10 is well known to those of ordinary skill in the art.

When light is reflected from a surface, the incident beam, the reflected beam, and the normal to the surface all lie in the same plane. The angle of incidence for the purposes of the present invention is defined in relation to the normal to the reflective surface. Thus, zero degrees of incidence is normal or perpendicular to the reflective surface while ninety degrees of incidence is parallel to the reflective surface. The reflection polarization refers to the orientation of the electric vector with respect to the incident/reflection plane. The perpendicular polarization is called the S polarization, and the parallel polarization is called the P polarization.

The reflectivity of a coated reflected surface on a facet of a rotating polygon mirror depends on certain criteria. These criteria are the wavelength of the incident light, the optical thickness of the coating on the reflective surface of the facet, the polarization of the incident light, the angle of the incident/reflected light, and the refractive index of optical materials used, i.e. the coating and the reflective surface. The time varying criteria in a rotating polygon is of course the angle of incidence and the corresponding angle of reflection.

The other variables are independent of time and can be pre-determined.

In the first embodiment of the present invention, the reflective surface of the facet of the rotating polygon mirror is coated with a dielectric material to an optical thickness of 0.05 of the optical wavelength of the incident beam. The incident beam is linearly polarized with an equal intensity of light in both the parallel and perpendicular planes, i.e. in both the S-polarization and the P-polarization. The beam is incident on the reflective surface of a facet of a rotating polygon mirror for a wide range of incident angle (0 to 80 degrees).

As an illustrative example, the incident beam can be from a HeNe laser with a wavelength of 632.8 nanometers. The incident light beam is linearly polarized with an equal intensity in both the parallel and perpendicular planes. The reflective surface of the fact of the polygon mirror can be aluminum. An optical thickness of 0.05 of the optical wavelength of the incident beam would be 31.64 nanometers. The optical thickness of a dielectric material coating is equal to the physical thickness of the dielectric material multiplied by the index of refraction of the dielectric material. The physical thickness will, therefore, be the optical thickness divided by the index of refraction. For a dielectric material of silicon dioxide with an index of refraction of 1.4571 and an optical thickness of 31.64 nanometers, the physical thickness will be 21.71 nanometers.

A 21.71 nanometers physically thick silicon dioxide ($SiO_2$) coating is applied to the aluminum reflective surface, equivalent to an optical thickness of 0.05 of the optical wavelength of the incident beam.

The use of HeNe lasers in optical scanning is well known to those of ordinary skill in the art. The use of aluminum to form a rotating polygon mirror or aluminum reflective surfaces on the facets of a rotating polygon mirror formed of a non-aluminum material is also well known to those of ordinary skill in the art. Means of coating a surface with silicon dioxide are equally as well known.

Reference is now made to FIG. 2, wherein there is illustrated a chart showing the percent of reflectivity of the S or perpendicular polarization component of the coherent HeNe light beam and the percent of reflectivity of the P or parallel polarization component of the coherent HeNe light beam for angles of incidence from zero to ninety degrees by five degree increments. The angle of incidence is the angle the beam strikes the reflective surface of the facet of the rotating polygon mirror, referred to normal.

The percent of reflectivity of the average polarization in FIG. 2 is determined by adding the percentages of reflectivities of the S polarization and the P polarization and dividing the result by 2. The uniformity of intensity in FIG. 1 is a relative number determined by the highest percent of reflectivity of the average polarization for an angle of incidence within the range of 0 to 60 degrees setting the corresponding uniformity of intensity at 100.00. In this illustration, the average polarization is highest at an angle of incidence of 25 degrees. The reflectivity of the average polarization and the uniformity of intensity are also shown in the chart of FIG. 2 for angles of incidence from zero to ninety degrees by five degree increments.

Figure 3:
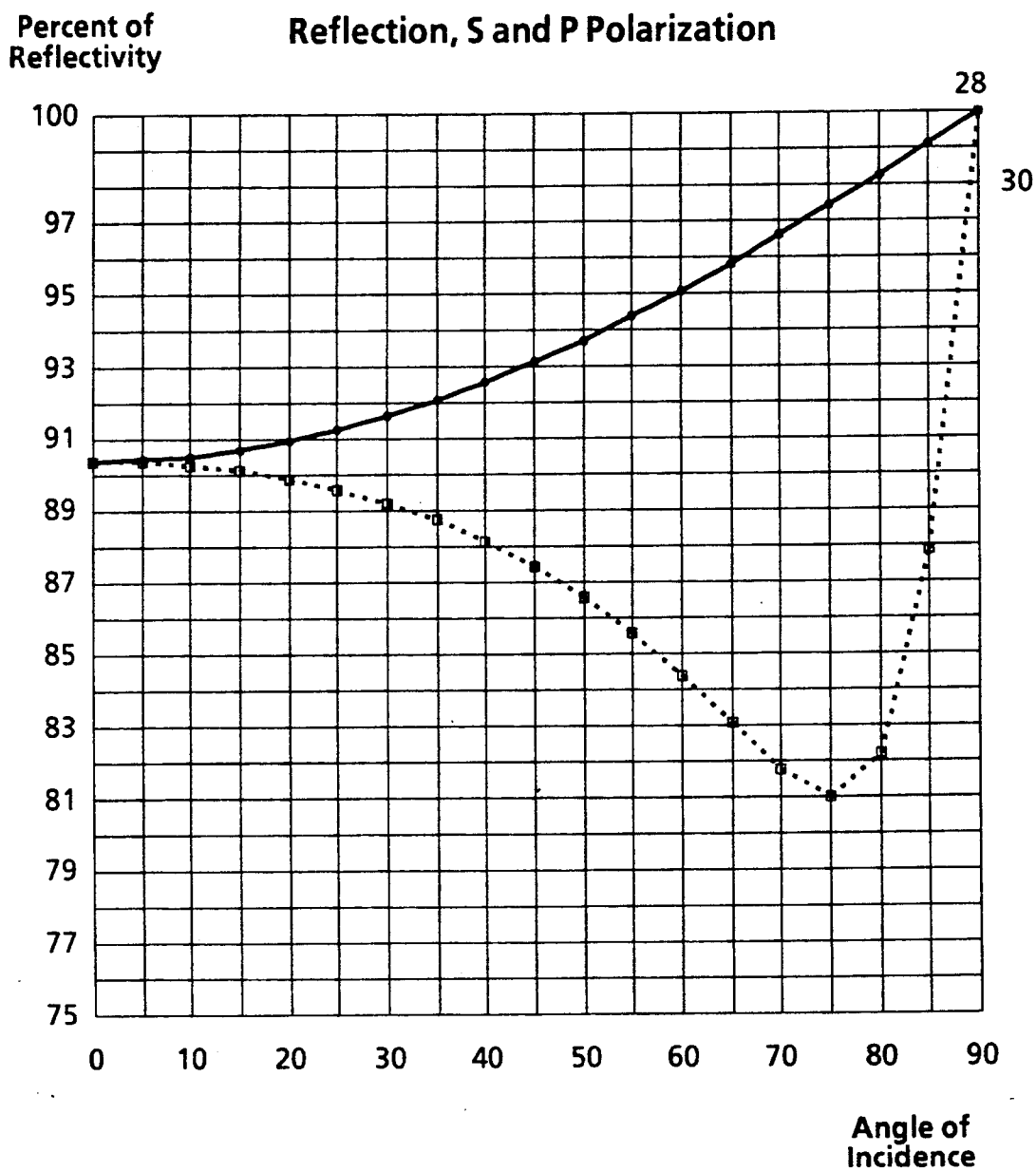
FIG. 3 is a graph illustrating the reflectivity of the S polarization and the P polarization of the embodiment of FIG. 2 formed according to the present invention.

As best shown in the graph of FIG. 3, the percent of reflectivity 28 of the S polarization steadily increases from 90.38 percent at zero degrees to 100.00 percent at 90 degrees. Ninety degrees is normal to the reflective surface. The percent of reflectivity 30 of the P polarization steadily declines from 90.38 percent at zero degrees to 81.03 percent at 75 degrees before sharply increasing to 100.00 percent at 90 degrees.

Figure 4:
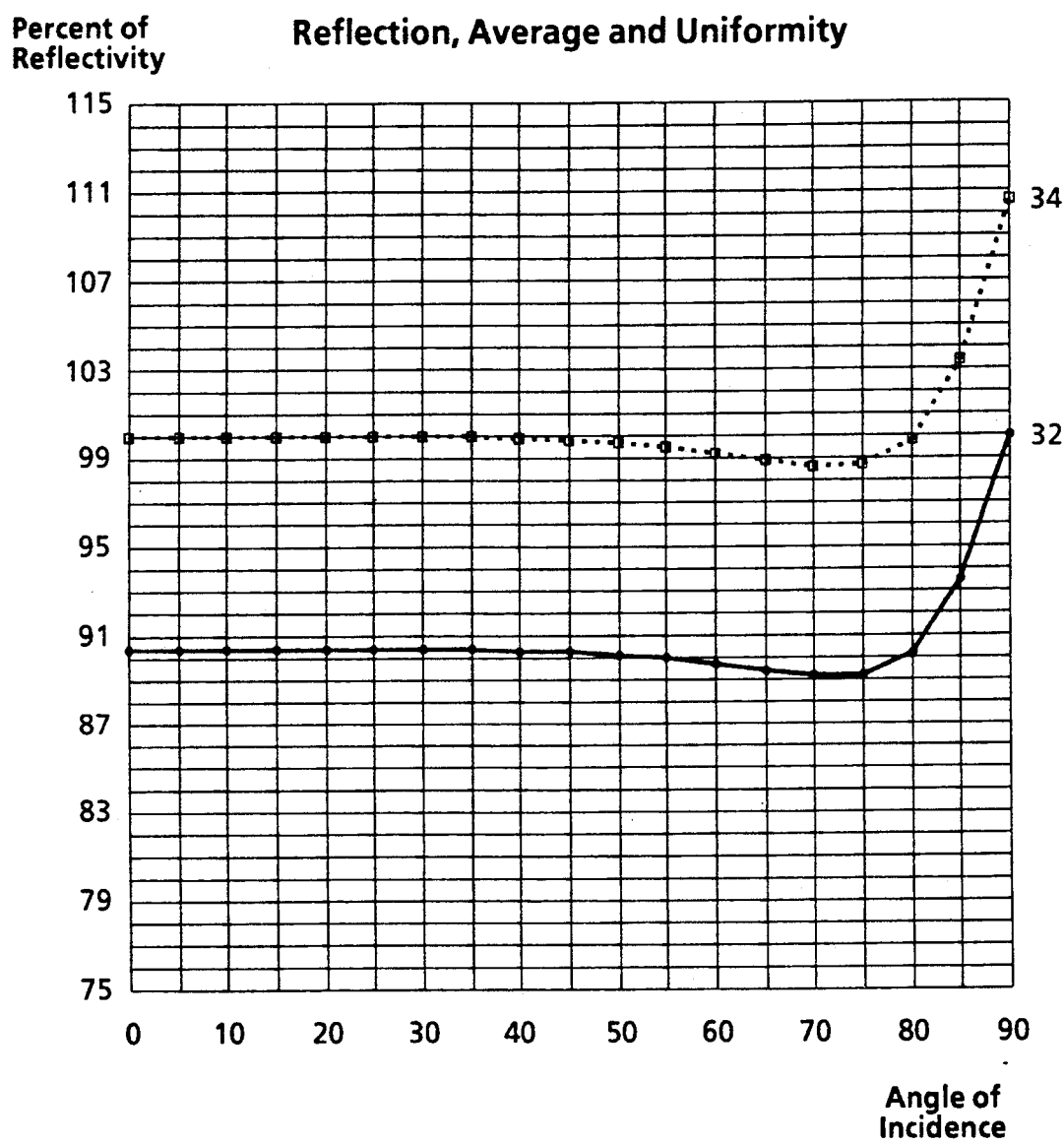
FIG. 4 is a graph illustrating the reflectively of the average and the uniformity of intensity of the embodiment of FIG. 2 formed according to the present invention.

As shown in the graph of FIG. 4, the reflectivity of the average polarization 32 averages 90 percent within 1 percent over the range of zero to eighty degrees with the uniformity of intensity 34 over the same range of angles being greater than 99 percent within 1 percent. The flatness of the uniformity of intensity 30 show how uniform the intensity of the beam is over a wide range of angles from 0 to 80 degrees, and most especially from 0 to 50 degrees. Yet the reflectivity of the average polarization over the same range of angles remains at fairly maximum rate of 90 percent.

The uniformity of intensity is about 100 for the angles near ninety degrees since the reference point of 100 is at 25 degrees.

As a second embodiment of the present invention, the reflective surface of the facet of the rotating polygon mirror is coated with a dielectric material to an optical thickness of 0.40 of the optical wavelength of the incident beam. The incident beam is linearly polarized in the perpendicular plane, i.e. in the S-polarization. The beam is incident on the reflective surface of a facet of a rotating polygon mirror for a wide range of incident angles (0 to 80 degrees).

As an illustrative example, the incident beam can be from a HeNe laser with a wavelength of 632.8 nanometers. The incident light beam is linearly polarized in the perpendicular plane. The reflective surface of the polygon mirror can be aluminum. A 253.12 nanometers optically thick which is equivalent to a 173.71 physically thick silicon dioxide (SiO2) coating is applied to the aluminum reflective surface, equivalent to an optical thickness of 0.40 of the optical wavelength of the incident beam.

The uniformity of intensity is a relative number determined by the highest percent of reflectivity of the S polarization for an angle of incidence within the range of 0 to 60 degrees set at 100.00. In this illustration, the reflectivity of the S polarization is highest at an angle of incidence of 40 degrees.

Reference is now made to FIG. 5, wherein there is illustrated a chart showing the percent of reflectivity of the S or perpendicular polarization component of the coherent HeNe light beam and the uniformity of intensity for angles of incidence from zero to ninety degrees by five degree increments.

Figure 6:
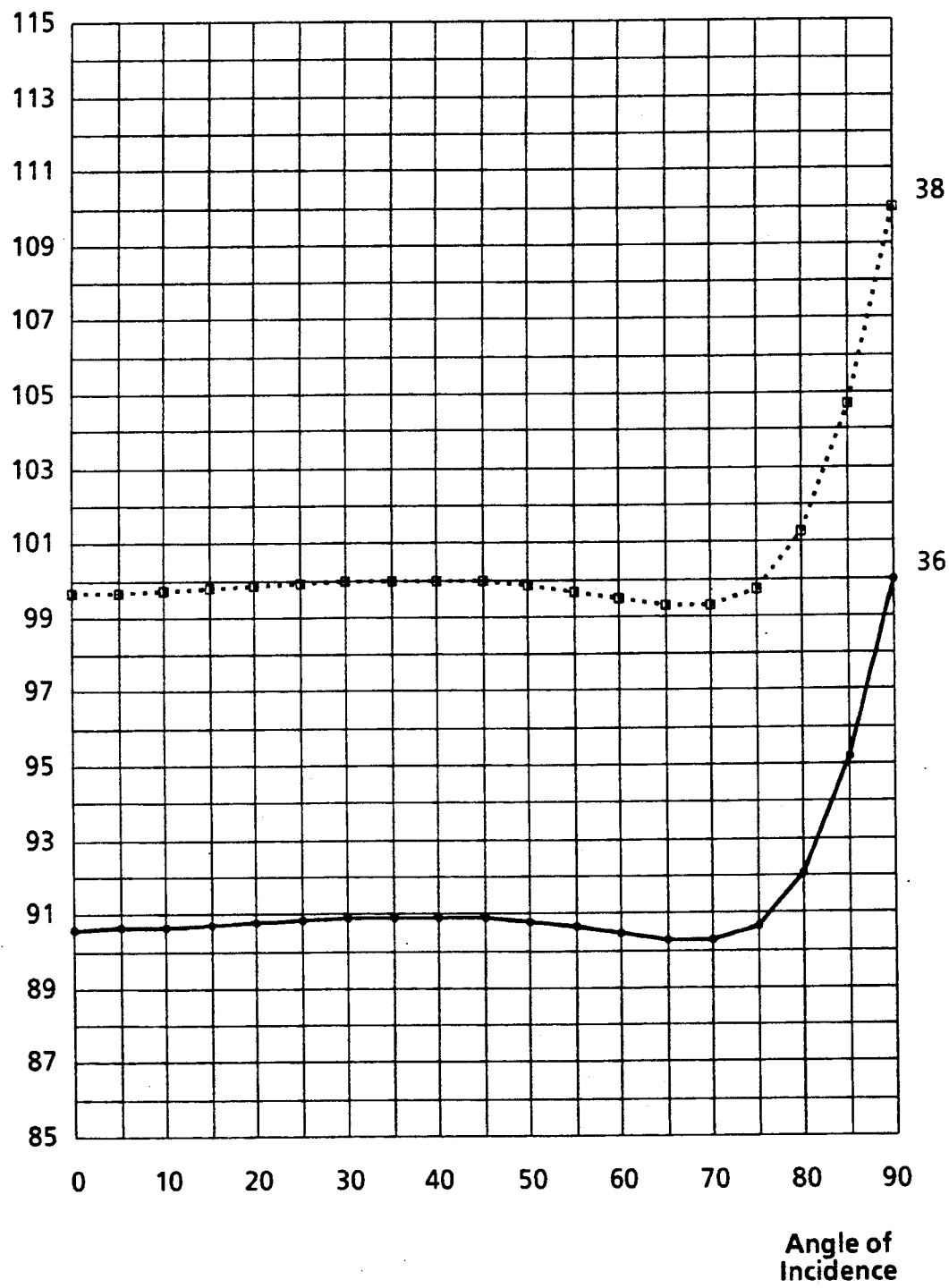
FIG. 6 is a graph illustrating the reflectivity of the S polarization and the uniformity of intensity of the embodiment of FIG. 5 formed according to the present invention.

As best shown in the graph of FIG. 6, the percent of reflectivity 36 of the S polarization slightly increases from 90.61 percent at zero degrees to 90.92 percent at 40 degrees, then slightly declines to 90.26 percent at 70 degrees before sharply increasing to 100.00 percent at 90 degrees. The uniformity of intensity 38 remains in the range of 99 to 100 from zero to 75 degrees. The flatness of the uniformity of intensity 30 show how uniform the intensity of the beam is over a wide range of angles from 0 to 80 degrees, and most especially from 0 to 50 degrees. Yet the reflectivity of the average polarization over the same range of angles remains at fairly maximum rate of 90 percent.

Typically, a S polarization only linearly polarized light would be used in a rotating polygon mirror optical scanning system when a linearly polarized light with equal intensity in both the S and P polarizations cannot be maintained due to the pre-polygon mirror optics before the rotating polygon mirror and its coated reflective surface.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. In an optical scanner employing an incident beam and a rotating polygon mirror, said rotating polygon mirror having at least one reflective surface, and said incident beam striking said at least one reflective surface and being reflected to a scan line, the improvement comprising:

means for generating a linearly polarized coherent incident beam with a specified wavelength, said incident beam having an equal intensity of light in the parallel and perpendicular polarization planes, and a coating of dielectric material deposited on said reflective surface, said coating having an optical thickness of 0.05 of said wavelength of said incident beam, such that said incident beam reflected to said scan line from said at least one reflective surface has a uniformity of intensity over a wide range of angles of incidence to said at least one reflective surface.

2. The optical scanner of claim 1 wherein said dielectric material is silicon dioxide.

3. In an optical scanner employing an incident beam and a rotating polygon mirror, said rotating polygon mirror having at least one reflective surface, and said incident beam striking said at least one reflective surface and being reflected to a scan line, the improvement comprising:

means for generating a linearly polarized coherent incident beam with a specified wavelength, said incident beam being polarized in the perpendicular polarization plane, and a coating of dielectric material deposited on said reflective surface, said coating having an optical thickness of 0.40 of said wavelength of said incident beam, such that said incident beam reflected to said scan line from said at least one reflective surface has a uniformity of intensity over a wide range of angles of incidence to said at least one reflective surface.

4. The optical scanner of claim 3 wherein said dielectric material is silicon dioxide.

* * * * *